Aug. 16, 1966  A. GLAZE  3,266,130
METHOD OF MAKING A PERMEABLE AIRFOIL SKIN
Filed Oct. 21, 1965  2 Sheets-Sheet 1
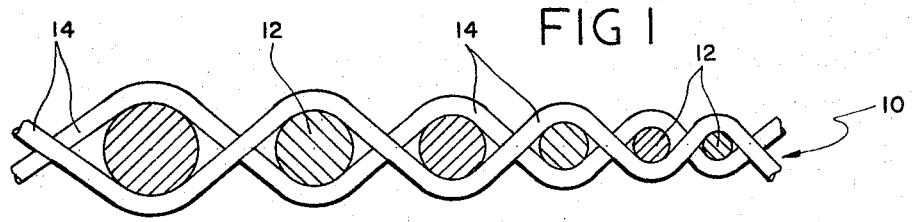
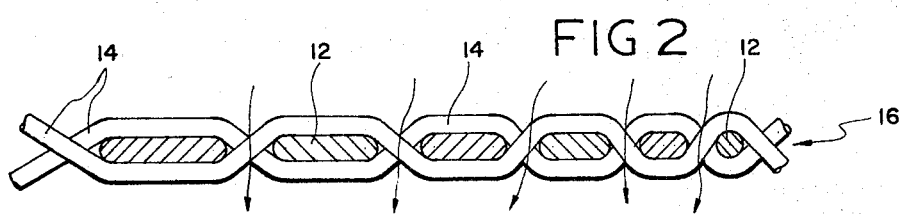
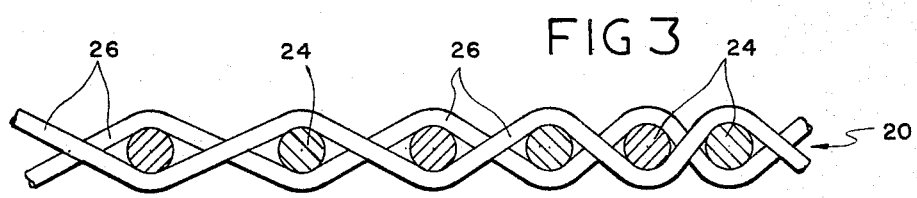
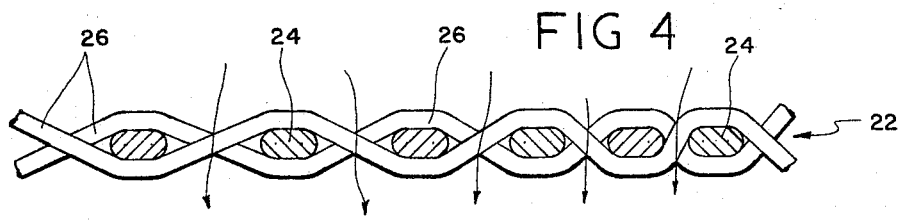
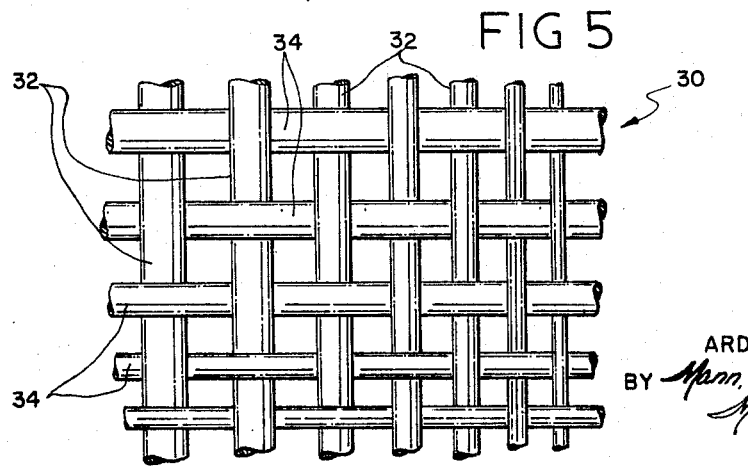
INVENTOR
ARDELLE GLAZE
BY Mann, Brown and
McWilliams
ATTY'S Aug. 16, 1966  A. GLAZE  3,266,130
METHOD OF MAKING A PERMEABLE AIRFOIL SKIN
Filed Oct. 21, 1965  2 Sheets-Sheet 2

INVENTOR
ARDELLE GLAZE
BY *Mann, Brown and McWilliams*
ATTY'S

United States Patent Office 3,266,130
Patented August 16, 1966

3,266,130
METHOD OF MAKING A PERMEABLE AIRFOIL SKIN
Ardelle Glaze, Fort Wayne, Ind., assignor to Fort Wayne Metals, Inc., a corporation of Indiana
Filed Oct. 21, 1965, Ser. No. 499,747
10 Claims. (Cl. 29—163.5)

The present invention relates to improvements in skin materials for airfoils, and the method of forming same. This application is a continuation-in-part of my copending application Serial No. 160,390, filed November 27, 1961, now Letters Patent No. 3,213,527, granted October 26, 1965, as a division of then pending application Serial No. 581,678, now Letters Patent No. 3,056,432 issued October 2, 1962.

While airfoils are most commonly recognized as constituting the lift or reaction elements of aircraft, it is of course known that airfoil surfaces are employed in many other structures where reaction is to be obtained from gaseous flow over formed surfaces as, for example, in propellers, turbine blades, jet engine blades, afterburner buckets and the like, and in the present disclosure the term "airfoil" is to be considered as having the broad connotation which includes reaction surfaces of the aforesaid character.

Thus, as applied specifically to the design and operation of aircraft, it is known that it is often desirable to provide for passage of fluid such as air through at least certain areas of the skin material of the aircraft, particularly in the airfoil sections thereof. Such passage of fluid through the skin material may be desired for several different reasons, one of the most common of which is the attainment of boundary layer control where air is drawn inwardly by suction or blown outwardly in selected areas of the wing surfaces, fuselage surfaces, tail surfaces, nose surfaces and the like so as to improve the lift and drag and other performance characteristics thereof. Another situation, in which passage of air through certain areas of the skin material of an airfoil is desirable, is for the purpose of producing a de-icing action and in such instances warm air is forced through leading edge surfaces of the wings to break up ice formation. Still a third instance where such fluid flow through the skin material is desired is found in high speed, high altitude flying where undue heating of the surfaces of the aircraft requires the application of a cooling media, and this cooling may be accomplished by the passage of fluid through the airfoil or aircraft skin materials to effect what is known as transpiration cooling. Other instances where such fluid flow may be advantageously employed are found in jet engine blades after-burner buckets and other high temperature applications where effective cooling is highly desirable.

In such cases of a permeable skin material, attainment of the desired function in a uniform manner requires that the degree of permeability of the skin material be precisely controlled or determined, and since this material is in contact with the air stream, the surface of the permeable material must have the maximum smoothness that is consistent with the permeable character of the material. Such permeable skin material as it is incorporated in the structure of an airfoil must of course be utilized in most instances in areas that correspond to the normal location of the sheet metal material that is customarily used, and must possess comparable strength and must be capable of being readily attached to the frame of the airfoil in the varying and curved shapes that are required. Moreover, the exposed surfaces of the skin material must be corrosion resistant to salt water, oils and fuels and at elevated temperatures.

Now, therefore, it is an objective of the present invention to provide a novel skin material for airfoils, having a smooth finish, while providing a controlled degree of permeability suitable for the accomplishment of the various desired cooling, and de-icing, and other functions set forth hereinabove. It is an objective related to the foregoing to provide a novel method of forming the aforesaid skin material.

Still another object of the present invention is to provide a skin material which may be woven to provide distinct areas of desired permeability, or to provide a permeability gradient of any desired rate of change. It will be understood that the term "woven" as used herein means the formation of a fabric with wires, whether or not stranded, by the interlacing, in any known manner, of the various wires used.

The foregoing and other objects and advantages of the present invention will be apparent from the following detailed description taken in conjunction with the appended drawings wherein:

FIGURE 1 is a fragmentary sectional view taken transversely through a woven wire fabric having a series of wires of progressively reduced diameter and showing the same in the condition which it assumes preparatory to a rolling operation;

FIGURE 2 is a fragmentary sectional view similar to FIGURE 1, showing the structure after a rolling operation has been effected;

FIGURE 3 is a fragmentary sectional view taken transversely through a woven wire fabric having uniform wire diameters, and in which the spacing between adjacent parallel wires is progressively reduced;

FIGURE 4 is a sectional view similar to FIGURE 3, showing the structure after a rolling operation has been effected;

FIGURE 5 is a fragmentary plan view of a laminated woven wire fabric in which variable permeability is attained in the final product by effecting a progressive reduction in wire size, as well as in wire spacing, both as regards the warp and the weft wires;

Figure 6:
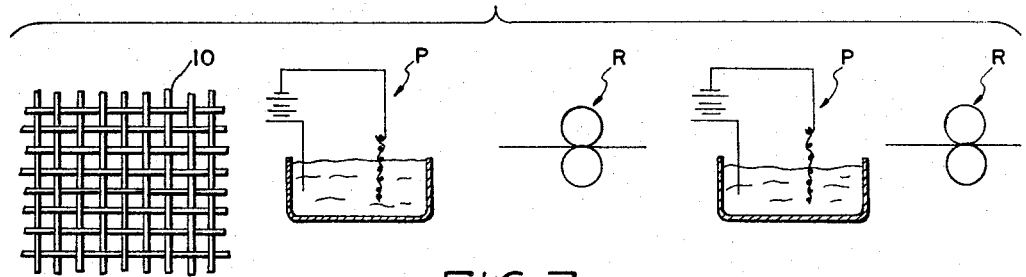
FIGURE 6 is a schematic representation of a process of finishing the woven skin material of the present invention.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

My copending application above referred to, is concerned with an airfoil skin material which is comprised of a woven wire fabric sheet having both its warp and weft strands made from wire stock of originally round cross section and thereafter subjected to a pressurized rolling operation tending to compress the sheet and thus bring the warp and weft wires more nearly into a common plane. Under the pressure involved in the performance of this "smoothing" operation, the crests (which occur in both the warp and the weft wires) are pressed into a somewhat interlocking relationship with the adjacent transversely extending wires, at points of original tangency therewith, thus providing interlocks at each intersection. At the same time, a general flattening of the sheet to a predetermined thinner dimension takes place.

As further disclosed in my copending application, a graduated permeability in the final manufactured airfoil sheet may be attained by providing originally round warp and weft wires of diameters which vary progressively, and being so arranged as to diminish in one direction so that after the rolling operation the interstices between the crossed wires will be of a corerspondingly gradually diminishing size. I have discovered additional useful arrangements for providing controlled localized or gradient permeability of any desired amount. Such arrangement involves the use of wire which may be either solid or stranded and, of varying diameter, and comprising either one or both of the warp and weft of the weave. Diameter variations, of course, should be determined at least in part by the degree of permissible surface coarseness or roughness, and by the exact degree of permeability desired. By selective use, however, of appropriate diameter wire in the weave, permeability may be very closely controlled while providing a strong airfoil skin capable of resisting heavy frictional and shear loads which would normally be applied to it.

It is evident that permeability, or the capacity of the skin material to pass air or other fluid therethrough is a function of the size of the space between each of a series of intersecting wires. In accordance with the invention, the degree of permeability may be increased or decreased by selective placement of the wire strands with respect to one another. Otherwise stated, parallel wires may be positioned from one another by a predetermined amount so that when they are intersected by transverse wires of the weave, controlled spacing results to form the desired area of the interstices between each. In such an application the strands may be of identical diameter, or varying diameter as taught in my aforementioned application, thus compounding the control over permeability by varying both wire diameter and spacing.

More specifically, in manufacturing the skin material of the present invention, the type and diameter of wires to be used for the warp and weft are preselected, and may be either stranded or solid. After determining the permeability desired for a particular area of the skin, the selected wires are woven or interlaced together, such as seen in FIGURES 1 and 5. In FIGURE 1 a portion of a fabric 10 comprises warp wires 12, and weft or woof wires 14. The spacing of the various wires is, of course, of importance and is taken under consideration in the weaving process.

Once woven, the fabric 10 is, in keeping with the invention, introduced to a bonding medium for the purpose of attaching intersecting wires thereby securing their relative position. Such an arrangement is shown in FIGURE 6, where an electrolytic plating process is shown schematically by the identifying character P. The electroplating has the effect of depositing metal at the wire junctures to secure the various wire strands together, thereby securing each strand with respect to every other strand with which it is engaged. It is to be understood that any other suitable brazing or bonding arrangement may be used without departing from the invention. The fabric is then rolled as shown in FIGURE 6, at R, so as to compress the wires beyond their elastic limit, to thereby smooth out at least the outer surface, and compress the thickness thereof resulting from the weaving or lacing process.

The rolling process, in addition to providing a smoothing effect, has a predictable effect on the spaces between the wires, thus permitting initial spacing to take into account changes in the spacing between the wires as a result of the rolling process. While intermediate bonding of the wires at their juncture inhibits spreading during rolling, nonetheless, some spreading is experienced and may, in keeping with the invention, be controlled within limits.

Depending upon the requirements of the airfoil material, it may be desirable to subject the skin to a considerable number of individual rolling processes to bring about a highly smooth surface. Accordingly, with each rolling process P, the skin is subjected to a prior bonding process such as electroplating at a station R so as to secure the various wires in their relative position, thereby assuring that uniformity of permeability is maintained within each specific area.

Selective use of gradually decreasing or increasing diameter wires in both warp and weft accomplishes, in accordance with the invention, a predetermined gradual change in the size of the interstices in a diagonal direction. Thus, referring to FIGURE 5, a fabric 30 having warp wires 32 and weft wires 34 is provided, the former decreasing in diameter from right to left, while the latter decreases from top to bottom as illustrated. As a consequence there is a controlled net decrease in the size of the spaces between intersecting wires in the direction of arrow A. This ararngement is merely exemplary of the numerous combinations and permutations which may be employed to obtain a desired permeability gradient over specific areas of a given air foil skin.

Still another arrangement for providing controlled permeability, in accordance with the invention, is the subjecting of the skin, in rolled or unrolled condition, depending upon its intended use, to an electroplating process which results in the build up of material on the wires, thereby decreasing the space between them. Accordingly, a controlled reduction in permeability is readily achieved. Electroplating processes in particular, being capable of a high degree of control of ion transfer, thus permit very accurate control of the resultant, size of the interstices, and thus, the permeability of the wire fabric. Further, selected sections of the fabric may be subjected to more or less plating, as desired, so as to permit selective finishing of sections of the same fabric onset. Indeed, specified areas may be completely infiltrated with plating material or the like so as to permit the use of fasteners through the skin to hold it securely in place.

Where the intended use makes it desirable that the surface finish be highly polished, but permeability is none the less necessary, both characteristics may be achieved, in accordance with the invention, by developing a laminar structure consisting of two or more layers of wire fabric of appropriate mesh together bonded, as contrasted to interwoven.

Figure 7:
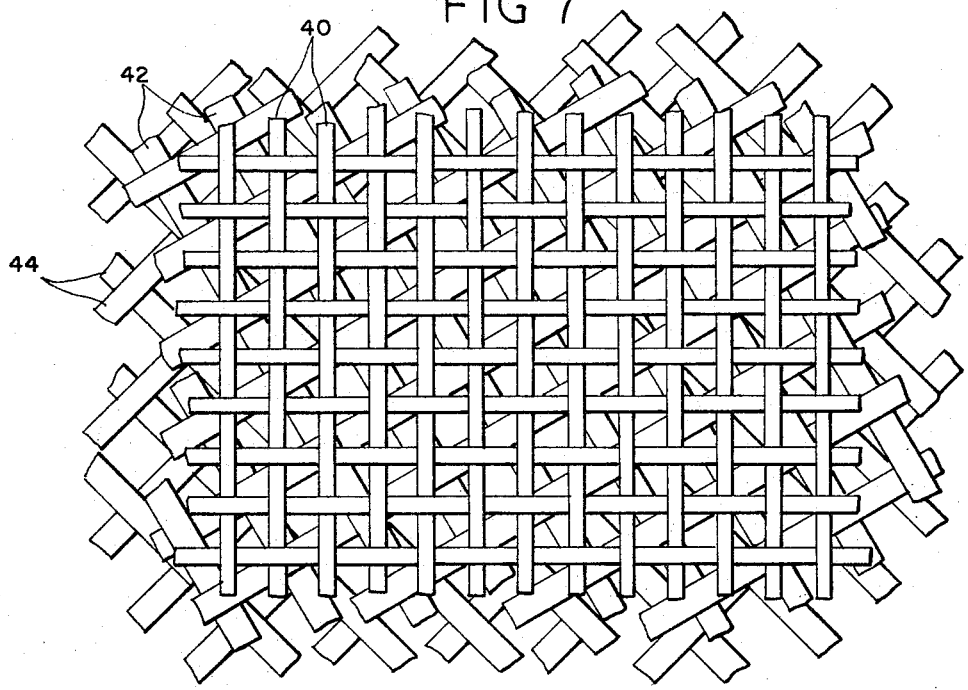
FIGURE 7 is an elevation of a laminar skin structure embodying still another aspect of the invention.
Figure 8:
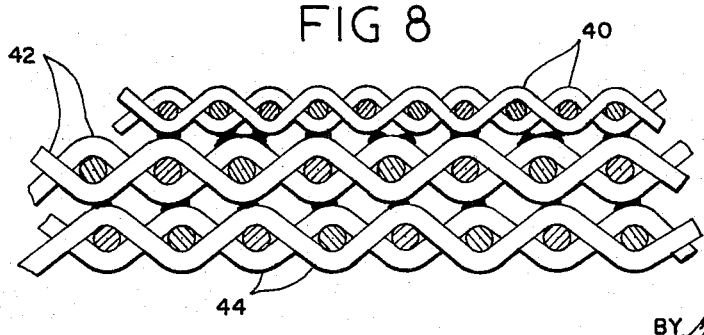
FIGURE 8 is an end view of the exemplary laminar structure of FIGURE 7.

Referring to FIGURES 7 and 8, the uppermost layer 40 may be of an extremely fine mesh, the wires themselves being stranded or solid. A fabric of about .0015" thickness and having mesh on the order of 300 wires in the warp and 1400 wires in the woof has proven satisfactory, and may be formed of stainless steel or another suitable high temperature alloy. The remaining layers 42 and 44 are preferably of heat dissipating alloy wire cloth and are of a more coarse weave. All of the laminar layers would be bonded together in a fashion which would, in accordance with the present invention, maintain the desired degree of permeability. The laminar sheet may vary in thickness from 0.0036" to 0.020" for many applications. Bonding of the various laminar layers may be facilitated by using the same bonding or electroplating material used to secure the strands of wire in each of the layers. By induction heating, ultrasonic welding, or heating in a controlled atmosphere, the bringing together of laminar layers under predetermined conditions would activate the already present bonding material with the resultant bonding of the laminae to one another without the addition of more bonding material between them. Alternatively, additional bonding materials may be used between layers of the laminar. For example, a solder wire or the like might be interwoven in one or more of the layers so that the application of appropriate heat would cause melting, and consequent bonding when the sheets are pressed together.

In order to further effect permeability, the various layers (see FIGURE 7) are positioned so that an acute angle is defined between the longitudinal direction of the warp wires, for example, of the respective layers. In the case shown, the warp wires define an angle of approximately 30°, 40° and 90°, respectively. As a consequence, the laminar has an overall smoothness on its outer surface because of the fine mesh layer, and controlled permeability brought about by the orientation of the under layers bonded thereto.

The end product is an exceptionally strong skin material which is capable of presenting any desired surface smoothness to the atmosphere, and which is readily secured to wing struts or other bracing members to which the airfoil may be attached. Such a laminar structure may be readily sheared, welded, riveted and is highly resistant to heat, radiation, fatigue and the elements generally. Such a structure may appear absolutely smooth, and even completely non-porous, but none the less have a desired permeability gradient which would permit the passage of gases through the surface for cooling purposes, ice removal, or other purposes, as hereinbefore mentioned.

It should be understood that in making the variable permiability wire cloth, the individual wires may initially be of any desired cross sectional shape, as for example, circular, oval, square, rectangular and the like, and also they may be electroplated while in this form, and prior to weaving.

It should be understood that the wire cloth 30, after it has been fabricated to provide the desired pattern of variable permeability, and rolled to the desired exterior smoothness, as heretofore described, is then preferably laminated and bonded to one or more underlayers of coarse cloth, oriented in various patterns, as for example as shown in FIGS. 7 and 8, to provide the necessary structural strength for the intended application.

I claim:

1. The method of making a permeable airfoil skin material comprising the steps of providing a plurality of mutually parallel warp wires, interlacing with said parallel wires a plurality of mutually parallel weft wires running transverse to said first mentioned wires to thereby form a woven fabric sheet, varying the spacing between certain of said adjacent parallel wires, bonding said wires to intersecting weft wires, and rolling said sheet to form a smooth surface thereon.

2. The method as set forth in claim 1 wherein the spacing is varied between adjacent warp wires of said fabrics.

3. The method as set forth in claim 1 wherein the variation in spacing is between adjacent weft wires of said fabric.

4. The method as set forth in claim 1 wherein the variation in the spacing between adjacent wires occurs in both the warp and weft of said fabric.

5. The method as set forth in claim 1 wherein said fabric is subjected to the additional steps of bonding said warp wires at the intersection thereof with said weft wires, and is rolled to form a smooth surface thereon.

6. The method of forming a permeable skin material comprising the steps of providing a fine mesh wire fabric, bonding at least one layer of a more coarse mesh fabric therebeneath, said more coarse layer having heat dissipation properties, thereby forming a laminar skin material of predetermined permeability.

7. The method of forming a laminar skin material of predetermined permeability comprising the steps of providing a fine mesh wire fabric, bonding thereto a second, more coarse wire fabric so that the warp and weft wires of said fabrics define an angle less than 90° with respect to each other.

8. The method as set forth in claim 7 wherein the angle between the warp and left wires of the respective layers is about 30°, and a third laminar layer being bonded thereto such that the angle between the warp and weft wires thereof, and the associated warp and weft wires of the top layer is about 40°.

9. The method of making permeable skin material comprising the steps of providing a series of wires defining the warp of said material, interlacing with said warp wires a series of wires defining the weft of said material, certain of said warp wires varying in diameter with respect to others of said warp wires to thereby provide a sheet of said materials having locally variable permeability, bonding each said wire at the points of intersection with other wires, and rolling said sheet to form a smooth surface thereon.

10. The method of making permeable skin material comprising the steps of providing a series of wires defining the warp of said material, interlacing with said warp wires a series of wires defining the weft of said material, certain of said weft wires varying in diameter with respect to others of said warp wires to thereby provide a sheet of said materials having locally variable permeability, bonding each said wire at the points of intersection with other wires, and rolling said sheet to form a smooth surface thereon.

References Cited by the Examiner

UNITED STATES PATENTS

| 3,049,796 | 8/1962 | Pall | 29—183.5 |
| 3,056,432 | 10/1962 | Glaze | 244—123 X |
| 3,061,912 | 11/1962 | Kalil | 29—163.5 |
| 3,123,446 | 3/1964 | Wheeler | 29—183.5 |
| 3,213,527 | 10/1965 | Glaze | 29—163.5 |

JOHN F. CAMPBELL, *Primary Examiner.*

THOMAS H. EAGER, *Examiner.*